United States Patent [19]
Poduje

[11] 3,880,006
[45] Apr. 29, 1975

[54] ELECTRONIC TEMPERATURE SENSING SYSTEM
[75] Inventor: Noel Poduje, Needham Heights, Mass.
[73] Assignee: Stow Laboratories, Inc., Hudson, Mass.
[22] Filed: Aug. 7, 1972
[21] Appl. No.: 278,557

[52] U.S. Cl. .......................................... 73/362 AR
[51] Int. Cl. ............................................ G01k 7/24
[58] Field of Search ................................. 73/362 AR

[56] References Cited
UNITED STATES PATENTS
| 3,754,442 | 8/1973 | Arnett | 73/362 AR |
| 3,783,692 | 1/1974 | Hansen | 73/362 AR |
| 3,805,616 | 4/1974 | Sugiyama | 73/362 AR |

Primary Examiner—Richard C. Queisser
Assistant Examiner—Frederick Shoon
Attorney, Agent, or Firm—Weingarten, Maxham & Schurgin

[57] ABSTRACT
An electronic system for providing an output voltage linearly representative of sensed temperature and in which different sensor modules are interchangeable with different processing circuitry modules without the need for recalibration. The sensor modules include a resistance temperature dependent sensor and associated compensating resistors. Predetermined voltages in this sensor module are sensed by the processing circuitry through a multiconductor cable and compensation and excitation currents are applied to the sensor module from the processing circuitry through the cable. Cable losses are of negligible effect on system accuracy. The processing circuitry provides a temperature indicating output signal from the sensed voltages and employs feedback control of the excitation current from this output signal to linearize the sensor response. Circuit adjustments of the processing circuitry permit standardization of all circuits for interchangeability of different circuitry modules. Also, the compensating resistors of the sensor module are adjusted during manufacture to provide the same variation in output signal with sensed temperature, irrespective of sensor characteristics, thereby permitting the interchange of different sensor modules without recalibration. As a result, different sensor and circuit modules may be interconnected by cables of different length without the need for recalibration to maintain system accuracy.

10 Claims, 4 Drawing Figures

ELECTRONIC TEMPERATURE SENSING SYSTEM

FIELD OF THE INVENTION

This invention relates to electronic temperature sensing instruments and more particularly to an electronic system employing a resistance temperature dependent sensor and associated circuit operative to provide an output voltage representative of sensed temperature and permit interchangeability of sensors and circuitry without any recalibration.

BACKGROUND OF THE INVENTION

Electronic instruments for measuring temperature usually employ a sensor which provides a signal representative of measured temperature and which is applied to associated circuitry operative to provide an output indication of sensed temperature. The sensor itself is typically of the voltaic type, such as a thermocouple, or of the resistive type, such as a thermistor or other resistance temperature dependent (RTD) element, for providing respectively a voltage or a resistance which varies correspondingly with the temperature being measured. Such temperature sensors are usually employed in a bridge circuit which provides an output voltage representative of the measured temperature. The sensor is an integral part of the bridge circuit and the replacement of a sensor requires recalibration of the associated circuit in order to provide an accurate output signal. The overall utility of such instruments is impaired by this requirement for recalibration each time the sensor or the remainder of the circuit is changed. As a further disadvantage, the length of the sensor leads connecting the sensor to associated circuitry affects circuit performance with a result that the utility of the instrument is also limited by constraints on the distance separating the sensor from its circuitry or the presence of switch contacts in the leads. Moreover most temperature sensors employed in instruments of known design exhibit a nonlinear response and provide an output signal which varies non-linearly with temperature and which either must be compensated by the sensing circuitry or which must be accounted for in utilization apparatus receiving a non-linear output signal.

BRIEF SUMMARY OF THE INVENTION

In accordance with the present invention, an electronic temperature sensing system employing temperature sensors and associated processing and indicating circuits is provided in which the sensors and circuits are interchangeable without the need for recalibration of a particular sensor and a particular circuit for operation together.

In specific implementation the sensors include RTD elements which are employed in circuit association with compensating resistors to define a sensor module which is interchangeable as a whole with the processing and indicating circuitry. The sensor module and processing and indicating circuitry are typically connected by a multiwire cable which may include switch contacts and cable connectors. The sensor module receives a compensating current and a controllable excitation current through the cable from the processing and indicating circuit. These currents are applied within the sensor module to provide a voltage drop across the RTD element reflecting temperature sensed. This voltage drop is sensed by the processing circuit via modified Kelvin connections of the cable to provide a control for the excitation current to linearize the variation in sensed voltage drop with the temperature of the RTD element.

The compensating resistors of the sensor module are selected with predetermined values during module manufacture to compensate for variations in the absolute resistance and temperature coefficient of the RTD element such that the detected voltage drop has a unique correspondence to temperature for all sensor modules. The maintenance of these relationships is simplified by the use of an operational amplifier technique which holds one end of the RTD element at virtual ground. This also simplifies the isolation of excitation and detection conductors in the cable between the processing electronics and the sensor module such that cable resistances do not affect the sensed voltage drop.

The ultimate output signal is derived through a calibrating network which provides predetermined adjustments in the voltage drop to provide an output signal indication selectable to represent either Centigrade or Fahrenheit temperature scales and compensated against differences in circuit components. This output signal can be applied to any output utilization device including needle indicators or data processing systems.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
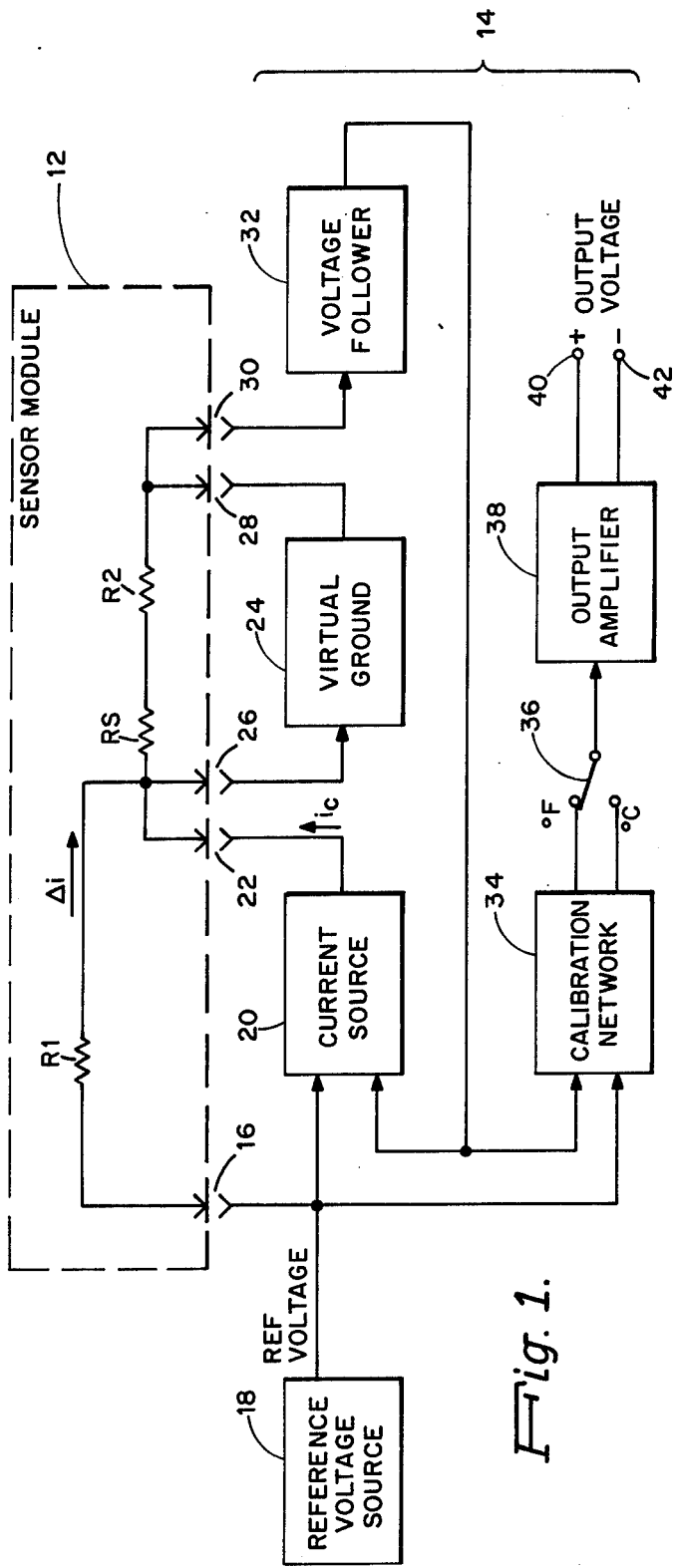
FIG. 1 is a partial schematic and partial block diagram of a temperature sensing system embodying the invention.

In FIG. 1 there is shown a block diagram of a preferred embodiment of the invention to provide for the complete interchangeability of a sensor module 12 and associated processing and indicating electronics 14. Within the sensor module 12 a first calibrating resistor R1, a resistance temperature dependent element Rs and a second calibrating resistor R2 are connected in series within module 12 and are further connected through a five lead cable to components in the processing electronics 14. The free end of the first calibrating resistor R1 is connected via a cable lead 16 to the reference voltage output of a reference voltage source 18. The reference voltage is also applied to a controllable current source 20 which in turn provides a controllable excitation current through a cable lead 22 to the junction between the first calibrating resistor R1 and the RTD element Rs. A virtual ground circuit 24 is connected through cable leads 26 and 28 to the series combination of resistors Rs and R2 and provides a virtual ground at the terminal of resistor Rs connected to cable lead 26 such that the voltage appearing at the terminal of resistor R2 contacting lead 28 is representative of the current, $\Delta i$ and $ic$, applied to the RTD element Rs through leads 16 and 22 respectively. The voltage appearing across the series combination of resistors Rs and R2 is detected through cable lead 30 by voltage follower, buffer amplifier 32 and its output is applied as a control input to the current source 20 and to a calibration network 34. The calibration network 34 also receives the reference voltage output of the source 18. The calibration network 34 in response to inputs from the reference source 18 and the output of the voltage follower 32 provides first and second outputs to selectable terminals of a switch 36 representing detected voltage across resistances Rs and R2 as adjusted to reflect temperature in Fahrenheit and Centigrade temperature scales. The switch 36 selects one of the outputs of the calibration network 34 for application to an output amplifier 38 which in turn provides a voltage output between terminals 40 and 42 with the voltage directly representing the sensed temperature by the RTD element Rs in either Fahrenheit or Centigrade scales.

Figure 1A:
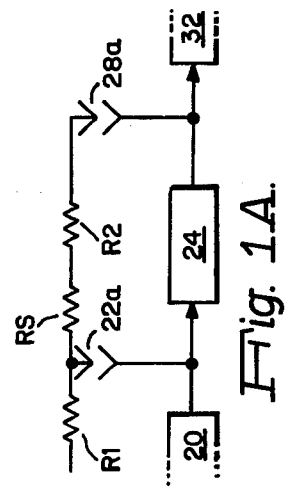
FIG. 1A is a schematic and block diagram of a modification to the FIG. 1 circuitry.

The control voltage from the voltage follower 32 to the current source 20 controls the current, ic, fed to the RTD element Rs so as to linearize the detected voltage across the resistors Rs and R2 as a function of temperature. In this way the output voltage across the terminals 40 and 42 is also caused to be a linear function of temperature. Additionally the resistors R1 and R2 provide two degrees of control over the characteristics of the sensor module 12 so that by proper selection of their values during module construction the voltage sensed by the voltage follower 32 and similarly the output of amplifier 38 can be made to exhibit a predetermined voltage output for a standard temperature point and a predetermined voltage versus temperature slope so that different sensor modules 12 can be utilized with the same electronics 14 with the knowledge that the same output voltage will indicate the same temperature for all sensor modules. As will be explained below, the circuit arrangement insures that the resistance in the cable leads 16, 22, 26, 28 and 30 is of no effect on the accuracy of the output indication, the leads 26 and 30 acting like Kelvin connections. In other applications where cable resistances are less important, a three wire cable as indicated in FIG. 1A may be employed by combining leads 22 and 26 into single lead 22a and leads 28 and 30 into single lead 28a. Slight variations in the reference voltage from the source 18, and other variations due to component differences from circuit to circuit, are compensated within the calibration network 34 to provide complete interchangeability of different electronics 14 with different sensor modules 12.

Figure 3:
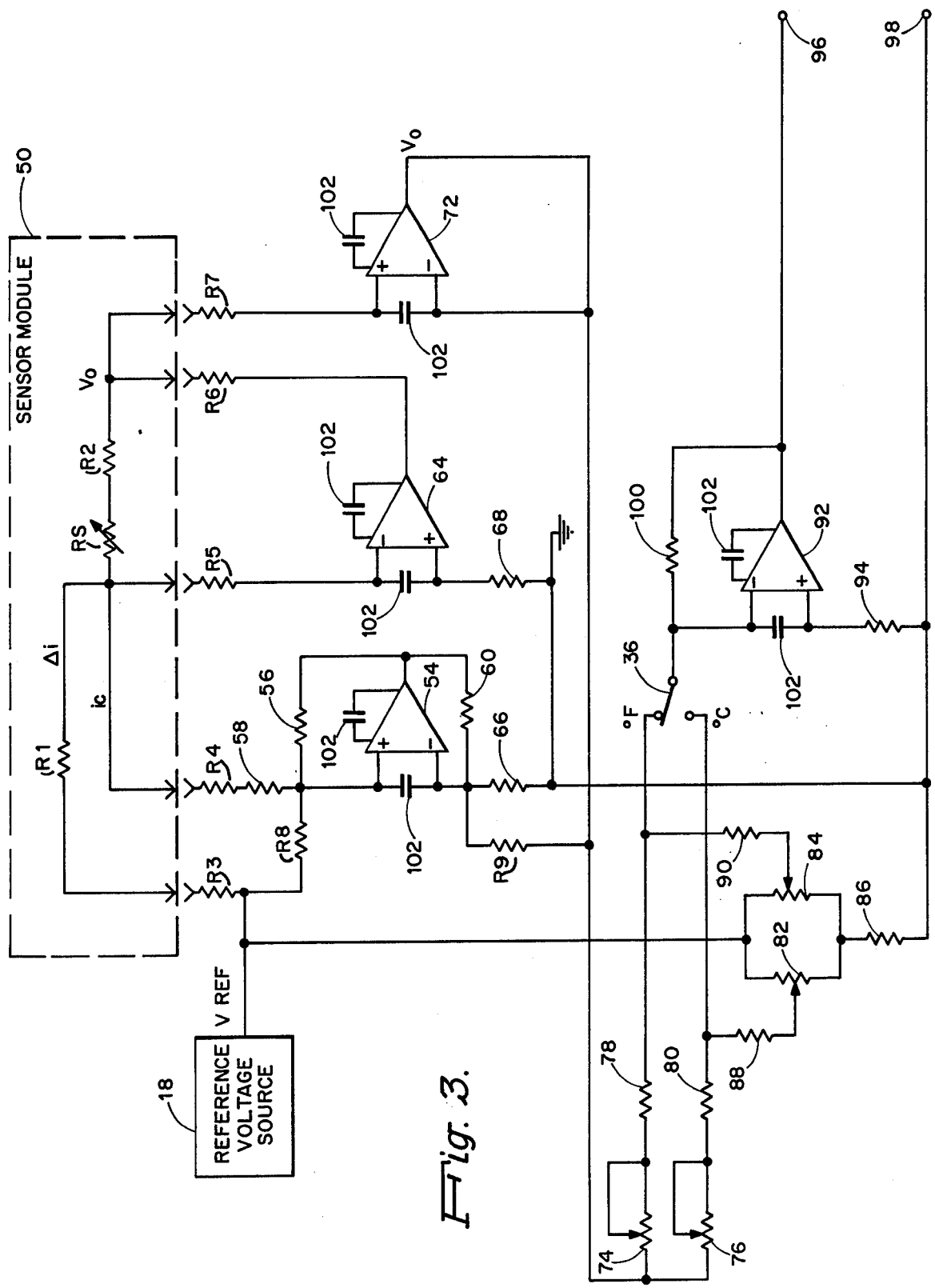
FIG. 3 is a schematic diagram of a temperature sensing system embodying the invention.

These features will now be more fully understood by reference to the detailed schematic diagram of FIG. 3. The voltage reference from source 18 is applied to a sensor module 50 through a cable resistor R3 and through a first calibrating resistor R1 to RTD resistor Rs. The reference source is also applied through a resistor R8 into a noninverting input of an amplifier 54. The output of amplifier 54 is fed back through a resistor 56 to its noninverting input and through a resistor 60 to the inverting input. A resistor 58 conducts from the non-inverting input of amplifier 54 through a cable resistor R4 to element Rs at the point connecting it to resistor R1. The circuitry associated with amplifier 54 provides the current source for current through resistor 58 and cable resistor R4 to the resistor Rs, and is operative on the principle of the Howland Current Pump. The current source is controllable in its current output by feedback applied to the inverting input through a resistor R9 from the output of the voltage follower amplifier to be described below.

A virtual ground amplifier 64 receives on an inverting, virtual ground input the signal from the sensor module 50 through cable resistor R5 from the junction of R1 and Rs. The output of amplifier 64 is applied to the sensor module 50 through cable resistor R6 to compensating resistor R2 and the temperature sensitive resistance Rs. The inverting input of amplifier 54 and noninverting input of amplifier 64 are connected to ground through respective resistors 66 and 68. The amplifier 64 operates in an operational mode through the feedback loop composed of resistors R6, R2 and Rs to hold the junction between R1 and Rs at a virtual ground. Very little current flows through resistor R5 since the feedback loop from the output of amplifier 64 acts as a current return for the excitation currents $\Delta i$ and $ic$. It should be noted that some other reference voltage may be substituted for the virtual ground established by amplifier 64 to provide a fixed voltage at the junction of resistors R1 and Rs with a minimum current flow in resistor R5.

The signal appearing at the junction between resistors R2 and R6 is applied through cable resistance R7 to a noninverting input of an amplifier 72, this amplifier 72 operates as a unity gain voltage follower amplifier with an impedance buffering function to limit the current drawn through cable resistance R7. The output of amplifier 72 is applied to an inverting input thereof and further provides the control feedback to amplifier 54 to linearize the response of resistor Rs as will be explained below. The output of amplifier 72 is also applied in the calibration network to first and second rheostats 74 and 76. The current through rheostat 74 is applied through a resistor 78 to the Fahrenheit selection terminal of switch 26 and the current out of rheostat 76 is applied through a resistor 80 to the Centigrade selection terminal of the switch 36.

A signal from the reference voltage source 18 is applied through first and second potentiometers 82 and 84 in parallel into a resistor 86 to ground. The slider arms of the potentiometers 82 and 84 are applied through respective resistors 88 and 90 to the Centigrade and Fahrenheit selection terminals of the switch 36. The selector arm of switch 36 is applied to an inverting input of an output amplifier 92, a noninverting input thereof being biased to ground through a resistor 94. The output of amplifier 92 along with circuit ground provide respective output terminals 96 and 98 for the system. A feedback resistor 100 between the output of amplifier 92 along with circuit ground provide respective output terminals 96 and 98 for the system. A feedback resistor 100 between the output of amplifier 92 and the inverting input provides gain determination. Compensating or stabilizing capacitors 102 are employed as necessary.

To linearize the response of the temperature sensitive resistor Rs, the current through this element is varied with the output voltage through the feedback control of current source 20. Calling io the current supplied by the current source through the cable resistor R4 to the temperature sensitive resistor Rs, the equation for this current is:

$$io = \frac{VREF}{R8} - \frac{Vo}{R9};  \quad (1)$$

where VREF is the output of the source 18 and Vo is the output of the sensor module 50 to the buffer amplifier 72 and consequently the output of the amplifier 72 as well.

Since the current input side of Rs is hold at virtual ground, Vo is equal to the voltage drop across Rs and R2 and is equal to $-io(Rs+R2)$. By substituting for $io$ in equation (1), Vo becomes $$Vo = \frac{VREF}{R8}(Rs+R2)\left[\frac{R9}{Rs+R2-R9}\right] \quad (2)$$

Figure 2:
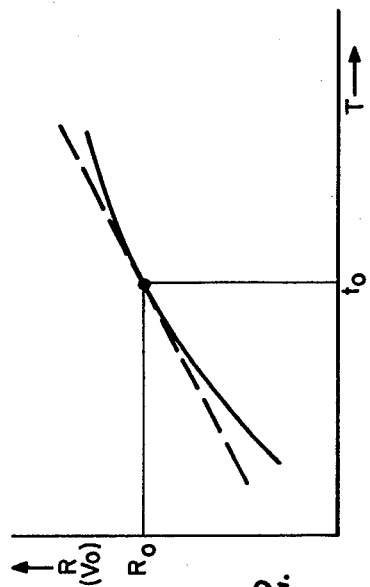
FIG. 2 is a plot of typical resistance versus temperature characteristics useful in describing operation of the invention.

The typical temperature sensitive resistor Rs is a platinum wire with a nonlinear temperature coefficient and is compensated in its nonlinearity by making R9 greater than Rs+R2. In that case the system gain increases with increasing Rs which tends to compensate the first order nonlinearity in the platinum resistor. The effect of this compensation can be seen from FIG. 2 showing in solid lines the temperature versus resistance characteristics of the resistor Rs and in dashed line the compensated output voltage variation with temperature produced by the system. The proper selection of R9 permits the actual output of the circuit at any two temperatures to be made exactly the same as it would be for a sensor with a constant temperature coefficient. For a platinum temperature sensor, over a temperature range of 200° C the nonlinearity error can be typically reduced to 0.02° C. It is to be noted that a positive or negative temperature coefficient element may be used in this invention with appropriate modifications where necessary and that nickel wire elements may be employed as well.

To express an idealized resistance for Rs in terms of temperature the following equation is applicable:

$$Rs = Rso(1+ \alpha T) \quad (3)$$

where Rso is the resistance of Rs at 0° C, $\alpha$ is the temperature coefficient of Rs in $(°C)^{-1}$ and T is the temperature of the sensor in °C. Higher order terms of the coefficient are negligible because of the linearizing effect of the controlled current source as described above and because of their secondary effect on sensor compensation. In terms of temperature T the output voltage Vo is $$Vo = -I(Rso)(1+ \alpha T) -iR2 \quad (4)$$

When different sensor resistances Rs are used different values of Rso and of $\alpha$ will be found. To provide for interchangeability of different sensor modules using different resistors Rs without recalibration of the system it is possible to hold the output voltage of the system for a given reference temperature, for example, 0° C, at a constant K2 and to hold the slope of the output voltage with temperature at a constant K1. These are expressed as follows:

$$\frac{dVo}{dT} = -i(Rso)\alpha = K1$$
$$Vso = -i(Rso) -iR2 = K2 \quad (5)$$

Viewing $i$ as the sum of $io$ plus a $\Delta i$ term attributable to current through the resistor R1 and viewing R2 as an arbitrary resistance value, two independent unknowns, $i$ and R2 are available for adjustments to insure this relationship holds. $\Delta i$ is the ratio of VREF to R1 so that by selection of R1 and R2 the proper constraints on the output voltage, constant value at a reference temperature and constant temperature dependence, can be maintained.

The actual output voltage provided at the terminal 96 and the effect of the calibration network 14 and output amplifier 38 as shown in FIG. 1 and in detail in FIG. 3 is to adjust circuit performance so that all sensor modules designed according to the indicated techniques can be interchanged will all processing circuits 14. This is accomplished by employing compensating rheostats 74 and 76 and potentiometers 88 and 90 to compensate for slight differences in current $i$ and reference voltage VREF provided in each unit. These variable resistances scale summations of VREF and Vo as applied through switch 36 to the inverting input of amplifier 92. This permits the output voltage of terminal 96 to be identical for all units at some reference temperature. The different input paths to the amplifier 92 are selected by switch 36 adjusting gains and offsets such that direct readout in either degrees Fahrenheit or Centigrade may be achieved.

The circuit outlined above provides the additional benefit of being substantially insensitive to the cable resistances R3 through R7 for even extremely long cables or in circumstances where the cable passes through a switching network and different resistances provided by different contacts are added into the cable resistance. R3 is in series with R1 and its value substantially smaller than the value of R1. Additionally the current $\Delta i$ provided through R1 is also a small percentage of the total current $i$. Typically the total effect of the resistor R3 is less than 0.02 percent. R4 has no effect over the system operation since its potential drop does not effect the current $io$ provided from the current source, that being maintained by independent control. Resistors R5 and R7 have extremely small currents passing through them for the sensing function of the respective amplifiers 64 and 72 and therefore their effect is negligible. The presence of resistor R6 has no significant effect because the value of the output voltage Vo is measured directly at the resistor R2 before any voltage drop introduced by the resistor R6 which conducts the majority of the sensor current to the output of amplifier 64.

Having described above a preferred embodiment for the present design it will occur to those skilled in the art that modifications and alterations can be implemented without departing from the spirit of the invention. Accordingly it is intended to limit the scope of the invention only as indicated in the following claims.

What is claimed is:

1. A system for sensing temperature comprising:
   a temperature dependent resistance element;
   a first calibration resistor of a preselected value;
   a second calibration resistor of a preselected value;
   said first resistor, said element and said second resistor being serially connected in that order to define a sensor module;
   a cable having five conductors connected to said sensor module, a first conductor connected to said first resistor at the free end, second and third conductors connected to the junction between said first resistor and said element and fourth and fifth conductors connected to the free end of said second resistor;

a reference level source connected to said first conductor;

a controllable current source operative to apply a current to said second conductor representative of said reference level and a control signal in response thereto;

said controllable current source including a current pump circuit;

an amplifier having an inverting input connected to said third conductor and an output connected to said fourth conductor whereby said third conductor and the junction between said first resistor and said element are substantially maintained at a predetermined virtual potential and the current through said element and second resistor from said current and reference level sources are conducted over said fourth conductor;

a buffer amplifier having a feedback path therearound coupled to said fifth conductor;

an output amplifier;

a switch having a selector arm applied to an input of said output amplifier;

first and second variable resistors responsive to said buffer amplifier output to conduct to first and second selectable terminals of said switch for selective application to the input of said output amplifier;

said first and second variable resistors being adjusted to provide said output amplifier with respective gains to indicate temperature at its output in Centigrade and Fahrenheit scales; and means for combining variable degrees of current from said reference level source with the signal at said first and second selectable terminals to provide predetermined signal offsets of said Centigrade and Fahrenheit scales and to compensate for system to system variations.

2. A temperature sensing system comprising:

a circuit including
  means for providing first and second currents along respective paths for application to a sensor module; and
  means operative in response to a signal voltage from said sensor module to provide an output indication of sensed temperature;

a sensor module including
  a resistance temperature dependent element;
  means for applying said first current from said circuit along a first path to one terminal of said element;
  means for applying said second current from said circuit along a second path to said one terminal of said element;
  means in said sensor module for producing a predetermined adjustment in said second current;
  means for providing a signal voltage for said circuit representative of the voltage response of said element to said first and second currents and representative of temperature sensed by said element; and
  means for providing a predetermined adjustment in the slope and offset of said signal voltage by an amount producing a predetermined correspondence between said signal voltage and the temperature sensed by said element throughout the operating temperature range whereby different sensor modules can be interchanged with said circuit without system recalibration.

3. A system for sensing temperature comprising:

a resistance temperature dependent element;

a first calibration resistor of preselected value;

a second calibration resistor of preselected value;

said element and said second resistor being serially interconnected and the series combination thereof being connected in series with said first resistor to define a sensor module;

a cable having five conductors connected to said sensor module, a first conductor being connected to said first resistor at the free end thereof, second and third conductors being connected to the junction between said first resistor and said series combination, and fourth and fifth conductors being connected to the free end of said series combination;

circuit means connected to the said sensor module by said cable and including
  means operative to apply first and second currents to said first and second conductors respectively;
  means coupled to said third and fourth conductors and operative to substantially maintain the junction between said first resistor and said series combination at a virtual potential thereby to provide a reference potential at said junction;
  means coupled to said fifth conductor and operative in response to a voltage across said series combination to provide an output signal representative of sensed temperature.

4. The temperature sensing system of claim 3 wherein said circuit means includes means for varying at least said second current in response to said output signal to linearize the variation of said output signal with temperature.

5. The temperature sensing system of claim 3 wherein said circuit means further includes means for scaling said output signal to provide temperature representations in a predetermined temperature scale.

6. The temperature sensing system of claim 3 wherein said circuit means further includes:
  means for scaling said output signal to represent temperature in a plurality of scales; and
  means for selecting one of said scales for output indication.

7. A temperature sensing system comprising:

a sensor module including
  means for applying a first current to a point of virtual potential within said module;
  means for applying a second current along a separate path to said point of virtual potential within said module;
  a resistance temperature dependent element having a predetermined resistance versus temperature characteristic and connected within said module to said point of virtual potential;

a circuit connected to said sensor module and including
  means for establishing said virtual potential;
  means for producing said first current for application to said module;
  means responsive to a signal across said resistance temperature dependent element for controlling the magnitude of said first current in response thereto;
  means responsive to said signal across said resistance temperature dependent element for indicating temperature sensed thereby.

8. A temperature sensing sytem comprising:
a sensor module including
- a resistance temperature dependent element;
- first and second compensation resistors each of predetermined value;
- said element and said second resistor being serially interconnected and the series combination thereof being connected in series with said first resistor;
- a plurality of terminals, a first terminal being connected to the free end of said first resistor, a second terminal being connected to the junction between said first resistor and said series combination, and a third terminal being connected to the free end of said series combination;

a circuit connected to the terminals of said sensor module and including
- means for applying an excitation signal to said module terminal to cause excitation current flow through said series combination;
- means for applying a compensating current to said first module terminal to cause compensating current flow through said first resistor and said series combination;
- means coupled to said third terminal for sensing a signal across said series combination;
- means responsive to said sensed signal for controlling said excitation current; and
- means operative in response to said sensed signal for indicating temperature sensed by said element.

9. The temperature sensing system of claim 2 further including means responsive to said signal voltage from said sensor module for providing a variation in at least said first current applied to said sensor module to linearize the variation in detected signal voltage with temperature sensed by said element.

10. A system for sensing temperature comprising:
- a temperature dependent resistance element;
- a first calibration resistor of a preselected value;
- a second calibration resistor of a preselected value;
- said first resistor, said element and said second resistor being serially connected in that order to define a sensor module;
- a cable having five conductors connected to said sensor module, a first conductor connected to said first resistor at the free end, second and third conductors connected to the junction between said first resistor and said element and fourth and fifth conductors connected to the free end of said second resistor;
- a reference level source connected to said first conductor;
- a controllable current source operative to apply a current to said second conductor representative of said reference level and a control signal in response thereto;
- said controllable current source including a current pump circuit;
- an amplifier having an inverting input connected to said third conductor and an output connected to said fourth conductor whereby said third conductor and the junction between said first resistor and said element are substantially maintained at a predetermined virtual potential and the current through said element and second resistor from said current and reference level sources are conducted over said fourth conductor;
- a buffer amplifier having a feedback path therearound coupled to said fifth conductor;
- an output amplifier operative to provide an output signal representative of temperature; and
- circuit means coupling the output of said buffer amplifier to the input of said output amplifier.

* * * * *